UNITED STATES PATENT OFFICE.

LEO F. CHEBOTAREF, OF WAPPINGERS FALLS, NEW YORK, ASSIGNOR, BY MESNE ASSIGNMENTS, TO NATIONAL ANILINE & CHEMICAL COMPANY, INC., A CORPORATION OF NEW YORK.

MANUFACTURE OF NAPHTHOLS.

1,381,280.

No Drawing.

Specification of Letters Patent. Patented June 14, 1921.

Application filed November 23, 1916. Serial No. 132,953.

*To all whom it may concern:*

Be it known that I, LEO F. CHEBOTAREF, a subject of the Czar of Russia, residing at Wappingers Falls, in the county of Dutchess and State of New York, have invented certain new and useful Improvements in the Manufacture of Naphthols, of which the following is a specification.

Hydroxynaphthoic acids (sometimes called naphthol-carboxylic acids) have been made hitherto by a directly synthetic process in which solid sodium naphtholate and carbonic acid gas were heated together under pressure in an autoclave.

The production of solid sodium naphtholate involves a considerable expense of time, energy and money; and, in spite of numerous efforts on the part of able chemists, no thoroughly satisfactory and inexpensive process for producing this substance has hitherto been developed.

I have discovered a new substance, properly characterized as a basic alkali naphtholate, and a process for making the same; and I have found that this new substance is a perfect substitute for solid sodium naphtholate in the process above mentioned for the manufacture of hydroxynaphthoic acids (or naphthol-carboxylic acids), as well as for other purposes unnecessary to be stated at length. My invention also covers the basic alkali naphtholate as a novel composition of matter useful for the above and other purposes.

Broadly speaking, the process of preparing the novel compound in question consists in suitably heating an intimate mixture of alkali salt of naphthalene-beta-sulfonic acid and caustic alkali (preferably caustic soda) until the mass is fused, and continuing the heat until separation into a top and a bottom layer. The following is a preferred example of proportions and temperatures, to which, however, I am not necessarily to be limited, since the process admits of a considerable range or scope in these particulars:

Fifteen hundred pounds of sodium salt of naphthalene-beta-sulfonic acid are fused with eleven hundred pounds of caustic soda, the two reagents being mixed by stirring. The reaction generally starts at about 280° C. and should be carried up to about 325° C. and not above 350°. The proportion of caustic alkali may be much higher than this without detriment, but I prefer to mix the materials in approximately the proportions above stated, which correspond to about 4 mols of caustic soda to 1 mol of sodium salt of naphthalene-beta-sulfonic acid. The heating is continued for one or two hours, when there will be formed two layers in the mass. The lower layer contains sodium sulfite which precipitates during the fusion. Upon decanting the top layer therefrom and allowing it to cool, said top layer will congeal into a yellow crystalline solid, easily soluble both in water and alcohol. Upon testing, this is found to agree in chemical composition with the empirical formula $C_{10}H_8O_2Na_2$, and in properties with a substance represented by the following graphic formula:—

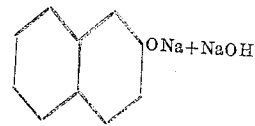

I call this basic sodium naphtholate. Of course, if potassium be substituted for sodium, the basic factor will be KOH.

The above process can be carried on in an open vessel, and the resulting novel reagent is quite inexpensive to produce as compared with the solid sodium beta-naphtholate hitherto used. It is an efficient substitute for the latter in the production of hydroxynaphthoic (or naphthol-carboxylic) acids, but a somewhat larger proportion of carbon dioxid is used with this basic naphtholate than with the older reagent. Otherwise, the process is identical with the older process.

I claim:

1. The process of making basic sodium naphtholate which consists in mixing fifteen parts of sodium salt of naphthalene-beta-sulfonic acid with eleven parts of caustic soda fusing at a temperature between 280 and 350° C., and removing the upper layer formed on prolonged heating.

2. The process of making basic alkali naphtholate which consists in mixing fifteen parts of sodium salt of naphthalene-beta-sulfonic acid with eleven parts of caustic soda, fusing at a temperature not higher than 350° C and removing the upper layer formed on prolonged heating.

3. As a novel composition of matter a basic alkali naphtholate, substantially as described.

4. As a novel composition of matter a yellow crystalline substance, readily soluble in water and alcohol and conforming substantially to the following composition—

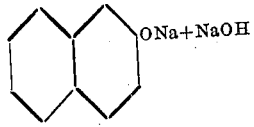

5. The process of making basic sodium naphtholate which consists in mixing fifteen parts of sodium salt of naphthalene-beta-sulfonic acid with eleven parts of caustic soda, and fusing at a temperature not higher than 350° C.

6. A step in the process of making basic alkali naphtholate which consists in fusing 1 mol alkali salt of naphthalene-beta-sulfonic acid with about 4 mols caustic alkali at a temperature between 280 and 350° C.

In testimony whereof I have affixed my signature.

DR. LEO F. CHEBOTAREF.

Witnesses:
F. JOHN LINGE,
A. R. TANNER.